Dec. 13, 1927.

C. E. FOX ET AL 1,652,620

OIL FILTER OR STRAINER

Filed Jan. 5, 1927

INVENTORS
C. E. Fox.
Walter Fox.

Dec. 13, 1927.

C. E. FOX ET AL 1,652,620

OIL FILTER OR STRAINER

Filed Jan. 5, 1927  2 Sheets-Sheet 2

INVENTORS
C. E. Fox
Walter Fox
By ... Atty.

Patented Dec. 13, 1927.

1,652,620

UNITED STATES PATENT OFFICE.

CHARLES ERNEST FOX, OF SUNNINGDALE, AND WALTER FOX, OF MANCHESTER, ENGLAND.

OIL FILTER OR STRAINER.

Application filed January 5, 1927, Serial No. 159,217, and in Great Britain July 16, 1926.

This invention, which relates to oil filters or strainers, has for its object the provision of a means or device constituting a filter or strainer whereby the dirt and foreign matter contained in lubricating oils can be removed therefrom.

The invention has particular reference to filters wherein the oil to be filtered is passed to and through a series of superimposed trays wherein the dirt or foreign matter in the oil is deposited, and the oil, which in some cases has been heated to facilitate the separation of any water therefrom and the precipitation of dirt and foreign matter, and from which the dirt and foreign matter has been extracted, is then passed to and through superimposed trays fitted with filter screens or sieves or filtering medium, the oil escaping from the last of the filter trays in a cleansed condition, means, in some cases, being provided to drain off and pass any water given off from the oil to and through a hydrostatic separator to separate any oil from said water.

The present invention consists in a construction of a filter whereby said filter can be cleaned at any time without draining off any oil, and wherein the trays are not submerged and are arranged so as to be slid, when required, from out of the filter case, and wherein the trays can be drained from all oil, leaving deposited matter only, which can be observed, scraped off and analyzed, and wherein the trays are weir-controlled and the oil passed through the strainers before escaping to collection, and wherein the depositing trays are fitted with a magnetic separator constituted by magnets applied to the underside of the tray which will be of non-magnetic material, or said trays may be fitted with a corrugated bottom or with a flat bottom with separate corrugated plates placed thereon to act as collectors of the sediment, use, in conjunction with the above, being made of a hydrostatic separator to separate any oil from the water, and of a heater located interior of the filter, means being provided for collecting and carrying away any surplus or overflow of oil.

In a modification of the invention, the use of a pump to circulate the oil over the trays is dispensed with, and said trays are submerged in oil, and the circulation of the oil is obtained by heating the oil and in using the thermosiphon system of heating, the hot oil, being lighter than the cold oil, rising and starting the circulation, the depositing trays being removable from the filter case by lifting out.

For a clear understanding of the invention, reference is to be had to the following description and accompanying sheets of drawings, wherein:—

Like numerals of reference indicate corresponding parts in the several figures.

Figure 1:
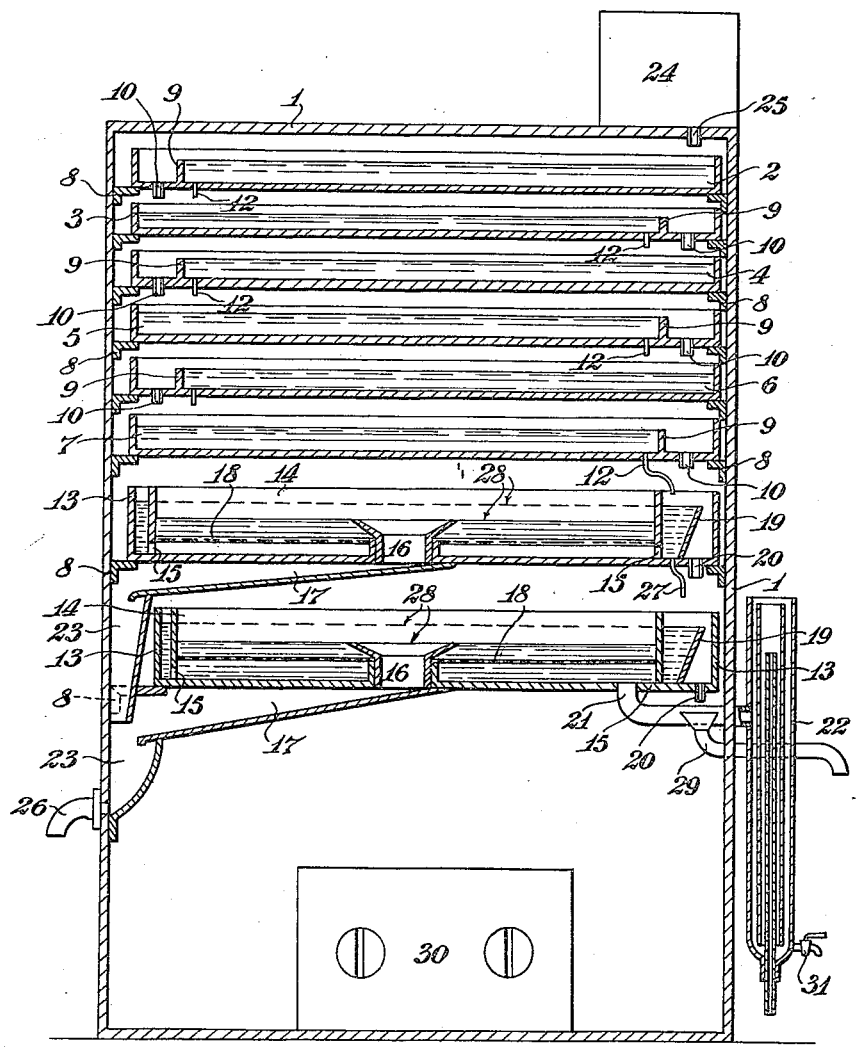
Figure 1 is a vertical sectional view of a filter or strainer in accordance with the invention.

In carrying out the invention, and referring first to Figure 1 of the drawings, the filter or strainer consists of a rectangular case 1, and a series of superimposed trays, respectively, 2, 3, 4, 5, 6 and 7 located in the upper part of the case 1 and removably supported by brackets 8 on the walls of said case 1, each tray having, towards one end thereof, a weir 9 of a height less than the height of the walls of the tray, and, further, the bottom of each tray is, between said weir 9 and the wall adjacent thereto, provided with a depending outlet pipe or pipes 10, or it may be a series of holes, and on the other side of said weir 9 with small holes or depending outlet pipes 12.

Below the trays aforesaid, which trays are the depositing trays, and removably supported on brackets 8, are two, or it may be more, superimposed trays 13 each provided with a removable filter frame 14 in the lower part of whose walls are holes 15, each tray 13 having, in the bottom thereof, a centrally disposed orifice fitted with a funnel-like outlet 16 which communicates with a chute 17 therebelow.

Each filter frame 14 carries a screen or sieve or a convenient filtering medium 18 of any suitable material, and each tray 13 is, towards one end, fitted with a weir 19 and also with a depending outlet or overflow pipe 20.

Further, the bottom filter or strainer tray 13 is fitted with an outlet pipe 21 which communicates with a hydrostatic separator 22 arranged exterior of the filter case 1, whilst the chutes 17 of said trays 13 open into oil catchers 23, from the lower of which catchers 23 the filtered oil escapes.

Working of the filter.

Dirty lubricating oil is pumped into a container 24 on the top of the casing 1, and flows by gravity therefrom through outlets 25 into the uppermost tray 2 till said oil rises and flows over the weir 9 thereof and thence by way of outlets 10 into the tray 3 therebelow, the oil, as it fills and flows across the tray 2, depositing dirt or foreign matter on to the bottom of said tray 2.

From tray 3 to tray 7 the oil travels in a serpentine fashion, dirt or foreign matter being deposited in each succeeding tray, any water falling through the holes or pipes 12 in the bottom of a tray into the tray therebelow, and the oil, from which the dirt and foreign matter has been extracted, falls from the lowermost tray 7 into the upper filter or strainer tray 13.

The oil, as it fills this strainer tray 13, passes through the holes 15 in the walls of the strainer frame 14 and rises up through the screen or sieve 18 thereof up to and over the top of the funnel-like outlet 16, down into chute 17 therebelow, to and through the catchers 23 to outlet 26, the oil as it reaches the top of the weir 19 of said tray 13 overflows and falls through the outlets 20 into the lower strainer tray 13, whilst any water in the upper tray 13 falls, by way of pipes 27, into the lower tray 13.

From the lower tray 13, the oil passes by way of the holes 15 in the walls of the strainer frame 14 thereof, and up through the screen or sieve 18, over and down through the funnel-like outlet 16 to its chute 17, and thence to the lower oil catcher 23, and then to outlet 26.

The head pressure 28, i. e. the distance between the level of the oil in the tray 13 and the top of the funnel-like outlet 16, which forces the oil up through the screen or sieve 18 being determined by the height of the weir 19 above said outlet 16, and, if there is more oil flowing through the filter than can pass through the lower screen or sieve 18, the surplus will overflow the weir 19 of said lower tray 13 and flow, by way of the hole or pipe 20, to the funnel-like overflow pipe 29 and be there collected.

Further, any water in the tray 7 falls by way of the holes or pipes 12 therein into the weir-controlled portion 19 of the upper strainer 13, and, sinking, passes, by way of the holes or pipes 27, into the weir-controlled portion 19 of the lower strainer 13 and from thence, by way of the holes 15 in the walls 14 of said lower strainer 13, to the hydrostatic separator 22, thus allowing of oily water draining away to said separator 22 and eventually flowing therefrom cleared of oil.

When the supply of oil to the filter is stopped, the oil will gradually drain from each tray (except the lowermost tray 13) through the holes or outlets 12 and 27 without disturbing the sediment, the sediment being left on the bottom of the trays and can be cleaned off wihout any loss of oil, whilst the lowermost tray 13 can be drained of oil through the cock 31 at the base of the separator 22 aforesaid.

To facilitate the separation of water from the oil, and the precipitation of dirt and foreign matter from said oil, said oil is heated before being fed to the container 24, or the oil may be heated by means of any convenient kind of heater, indicated by reference numeral 30, located in the bottom of the filter casing 1.

The screening or sieving medium of the strainer trays may be of any suitable material, and said screens or sieving media, and with them their strainer frames, may be removed by simply unscrewing the funnel-like outlets 16 and then lifting out the strainer frames and screens or sieves which may be cleansed by means of a jet of steam, or other convenient and appropriate methods or means.

The front of the casing of the filter or strainer may be constituted by a door (not shown), and by opening the same, the whole of the working of the filter or strainer can be observed, and every part is readily accessible, and as the trays of the filter or strainer are slidable on their brackets, said trays can be readily withdrawn for cleansing or other purposes.

Figure 2:
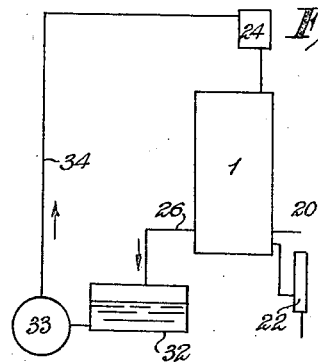
Figure 2 is a diagrammatic view illustrative of a continuous circulation of oil to filter or strainer.

To provide for a continuous circulation of the oil, the oil outlet pipe 26 may be carried to an oil tank 32, Figure 2, which is connected up to a pump 33, which, in turn, is connected by pipe 34 to the oil container 24 on the top of the filter case 1, so that by keeping the pump 33 running, the oil is continuously run through the filter, which makes for further clearing of the oil.

From the foregoing it will be apparent that a novel and distinctive feature of the invention resides in providing a casing 1 having therein a plurality of superposed depositing or precipitation trays 2 each having separate oil and water outlets 10 and 12 respectively, the latter communicating with the chamber of the tray formed by the weir 9, and said depositing trays being adapted to discharge into a strainer tray designated generally as 13. This strainer tray is adapted to receive discharge from the depositing trays through the outlets from the lowermost depositing tray and is provided with means for conducting the oil upwardly through a strainer 18. This arrangement provides a series of depositing trays which collect the heavy particles of foreign matter by molecular attraction so that before the oil is discharged into the strainer tray the heavy particles have been eliminated while any flocculent material, which may be carried through the depositing trays, will be collected on the underside of the strainer 18, the low velocity and low head of pressure causing the flocculent matter to rest against the screen instead of being forced into the meshes thereof and thereby rendering the cleaning of the screen an easy matter. When it is desired to clean the apparatus, the depositing trays 2 may be readily removed and scraped and the strainer trays may likewise be withdrawn and the screens easily cleaned by lifting up the inner frame carrying the gauze screen.

Figure 3:
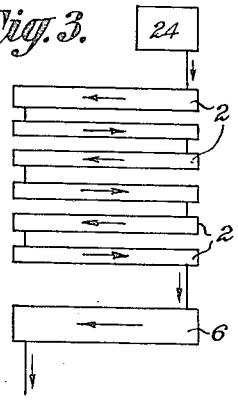
Figures 3, 4 and 5 are diagrams illustrative of different ways of circulating the oil.
Figure 4:
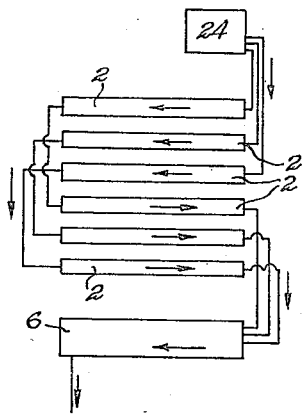
Figure 5:
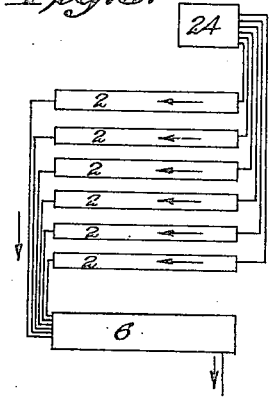

Referring now to Figures 3, 4 and 5 of the drawings, illustrative of the circulation of the oil, Figure 3 shows the trays 2 connected up in series, that is to say, the oil in its passage from container 24 to strainer device 13 takes a serpentine course through said trays 2, as shown by the arrows.

Figure 4 shows the trays 2 connected up in parallel-series, that is to say, the oil from container 24 is fed direct to the first, second and third trays 2, and then flows from the first tray to the fourth tray, from the second tray to the fifth tray, from the third tray to the sixth day, and then from the fourth tray, the fifth tray and the sixth tray to the strainer device 13.

Figure 5 shows the trays 2 connected up in parallel, that is to say, the oil from container 24 is fed direct to each of the trays 2, and then flows direct from each tray 2 to the strainer device 13.

Figure 6:
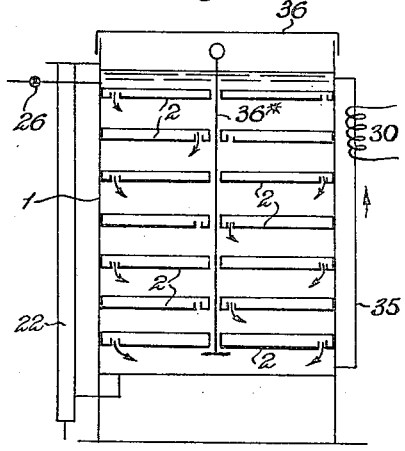
Figures 6 and 7 are sectional views illustrative of modified arrangements of the depositing trays of the filter or strainer.

Referring now to the modified arrangement of device shown in Figure 6, the case 1 is cylindrical and provided with a removable top 36 to allow of the insertion and removal of the circular and weir-controlled depositing trays 2, said trays being conveniently spaced apart and carried by a vertically disposed rod 36 by means of which they can be lifted out of the case 1.

From below the lowermost depositing tray 2 there is carried a pipe 35 which extends up to and over the uppermost depositing tray 2, so that the oil, warmed by the heat given off from the heating coil 30 round the pipe line 35 travels upwards and is delivered to the top tray 2 and again passes through the various trays, thus making for a continuous circulation of oil with a further clearing of the same, said oil having been poured into the casing 1 to a level such as to submerge all the depositing trays 2 therein, the continuous circulation of the oil being obtained by heating the same by the heating coil 30 and in using the thermo-siphon system of heating.

The trays are provided with weir-controlled outlet holes 2 arranged in such a manner as to cause a serpentine flow of oil when sinking to the bottom of the casing 1, and, after working for a while, the top oil may be drawn off, by way of outlet 26, into any convenient external strainer devices, any oily water in the bottom of the casing 1 passing to the hydrostatic separator 22.

Figure 7:
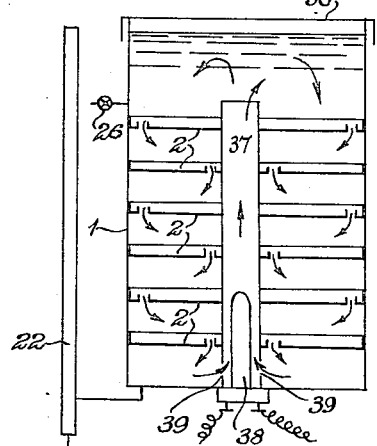

Referring now to Figure 7 of the drawings, the case 1 is a cylindrical case with removable top 36 to allow of the insertion and removal of the depositing trays 2 which are attached to a vertical and centrally disposed tube 37, and are made to lift out therewith, said tube 37, which extends to the bottom of the casing 1 and serves to receive an electric tube heater 38, or other heater, being at its lower end provided with holes 39.

Oil is fed into the casing 1 to a level such as to submerge all the trays 2, and travels through the series of trays 2 in a serpentine path to the bottom of the casing 1 and thence by way of the holes 39 aforesaid into and up the tube 37, where it is heated by the heater 38, up to and into the space above the uppermost tray 2, the above arrangement making for a continuous circulation as obtains with reference to the arrangement shown in Figure 6, the top oil being drawn off by way of outlet 26 to any convenient external strainer device, any oily water in the bottom of the casing 1 passing to the hydrostatic separator 22.

We claim:—

1. An oil filter or strainer of the kind set forth, characterized by a cylindrical case, a series of submerged superimposed circular and weir-controlled depositing trays, a centrally disposed tube connected to the circular trays and extending down to the bottom of the case, holes in the lower end of said centrally disposed tube, an electric tube heater, located in said tube to provide for the upward and continuous flow of the oil, and a hydrostatic separator connected to the case at the part below the lowermost depositing tray, as herein described.

2. An oil purifying device comprising a casing, means for feeding oil to be purified at the top of the casing, and a plurality of removable depositing trays arranged one beneath the other in the casing, and each tray including an interior vertical wall of less height than the side or end walls of the tray thereby providing a depositing and collecting chamber within the tray, and the bottom of said tray being provided with an oil outlet between said wall and an end wall of the tray and also provided with a water outlet communicating with the depositing chamber.

3. An oil filter comprising a casing, a plurality of relatively shallow depositing trays arranged in vertical series one above the other and each having a weir adjacent one end thereof and of a height less than that of the walls of the tray, an oil outlet hole formed in the bottom of the tray between the weir and the wall adjacent thereto and a water outlet hole located at the other side of said weir.

4. An oil filter comprising a casing, a plurality of superposed relatively shallow depositing trays each having a weir adjacent one end wall thereof and of less height than the walls of the tray, and the bottom of said depositing tray having an oil hole between said weir and the wall adjacent thereto and a water hole on the other side of the weir, and strainer trays arranged beneath said depositing trays, each strainer tray having therein a strainer frame comprising walls of the same height as the walls of the tray but of less length and width than the tray, a weir between one end of the strainer frame and one wall of the tray, a horizontal strainer supported in said strainer frame and the latter having openings communicating with the oil chamber formed about the frame by said weir, and a central tubular outlet member carried by the tray and having its inlet end arranged above the plane of the tray, and means communicating with said tubular outlets for carrying away the purified oil.

5. An oil filter and strainer comprising a casing, a plurality of removable sediment-collecting trays each having a weir and arranged one above the other in the casing, the bottoms of said trays having openings at opposite sides of the weir for permitting the escape of oil and water from one to the other, heating means within said casing, means for collecting the purified oil, means for returning the purified oil to the upper end of the casing, and a hydrostatic separator located at the exterior of the casing and connected to the lower tray.

6. An oil filter for removing heavy and flocculent matter including in combination, a plurality of shallow depositing trays and a strainer tray, the bottoms of said depositing trays collecting the heavy particles by molecular attraction and being arranged one above the other and each having separate oil and water outlets, means on said strainer tray for receiving discharge from the depositing trays, a strainer arranged above the bottom of said strainer tray whereby oil received by said tray through said means may be conducted upwardly through the filter, and means associated with the strainer tray for conducting away the oil after it has passed through said filter.

7. An oil filter for removing heavy and flocculent matter including in combination, a plurality of superposed shallow depositing trays each having separate oil and water outlets, a strainer tray located beneath the depositing trays and adapted to receive discharge therefrom, a strainer spaced from the bottom of said tray, and means for conducting the oil received from the depositing trays upwardly through said strainer, and an oil outlet member for said strainer tray and receiving the oil after it has passed through the strainer.

8. An oil filter for removing heavy and flocculent matter including in combination, a plurality of shallow superposed depositing trays each having a weir and separate oil and water outlets on opposite sides of the weir and adapted to collect on the bottom thereof heavy impurities from the oil by molecular attraction while the oil is flowing over and downwardly through said trays, and a strainer tray adapted to receive discharge from the depositing trays and having therein a strainer, and means for receiving the discharge from said depositing trays to conduct the oil upwardly through strainer to restrain flocculent matter and means associated with said strainer tray for carrying off the oil passing through said strainer.

9. An oil filter for removing heavy or flocculent matter including in combination, a plurality of relatively shallow superposed depositing trays and a strainer tray located beneath said depositing trays, each of said depositing trays having oil and water outlets, and said strainer tray having therein a strainer spaced from the bottom wall and communicating with a chamber adapted to receive oil and water from the depositing trays, and said chamber having a water outlet, and means for conducting oil away from the strainer tray after it has passed through the strainer.

10. An oil filter for removing heavy and flocculent matter from lubricating oils to render them fit for re-use, including in combination, a plurality of relatively shallow precipitation trays each having a weir wall forming a collecting chamber for heavy particles, and the bottom of said tray having an oil outlet opening on the outlet side of the weir wall and a water opening on the inside of the weir wall thereby to remove the water from the bottom of the collecting chamber to assist molecular attraction between said bottom and the heavy particles in the oil, the flow from said precipitation trays being downward and a strainer tray located beneath the precipitation trays and having a strainer therein, and means for conducting oil upwardly through said strainer under low velocity and small head pressure.

In testimony whereof we have affixed our signatures hereto this 14th day of December, 1926.

CHARLES ERNEST FOX.
WALTER FOX.